United States Patent [19]
Johnson et al.

[11] Patent Number: 5,373,320
[45] Date of Patent: Dec. 13, 1994

[54] SURVEILLANCE SYSTEM HAVING A MICROCHANNEL IMAGE INTENSIFIER TUBE

[75] Inventors: David B. Johnson, San Jose; Allan W. Scott, Los Altos; Thomas Daley, San Jose, all of Calif.

[73] Assignee: Intevac, Inc., Santa Clara, Calif.

[21] Appl. No.: 63,233

[22] Filed: May 18, 1993

[51] Int. Cl.⁵ ............................................. H04N 5/238
[52] U.S. Cl. ................................... 348/217; 348/335; 348/361
[58] Field of Search ............... 358/108, 225, 226, 227, 358/228; 348/216, 217, 360, 361, 335

[56] References Cited

U.S. PATENT DOCUMENTS 4,551,763 11/1985 Swinehart et al. .................... 358/225
4,581,648  4/1986 Ganther .............................. 358/211
5,159,469 10/1992 Takagi ................................ 358/227

*Primary Examiner*—Tommy P. Chin
*Assistant Examiner*—Emil P. Lenchak
*Attorney, Agent, or Firm*—Stanley Z. Cole

[57] ABSTRACT

A camera attachment converts a standard day-light video camera into a day/night-vision video camera. The attachment device has a threaded input and output to physically and optically interconnect an auto-iris lens to a video camera. The attachment device contains an image intensifier tube and a fiber optic image conduit either of which may be switched into the through optical path to receive and either amplify or simply conduct the light image to a relay lens. The relay lens focuses the output image from either the image tube or the fiber optic image conduit onto the optical input of the video camera. The switching of the image intensifier tube or the fiber optic image conduit is dependent upon the ambient light conditions of the camera so that if there is insufficient lighting for normal daytime viewing the image tube is activated and switched into the through optical path of the camera.

17 Claims, 6 Drawing Sheets

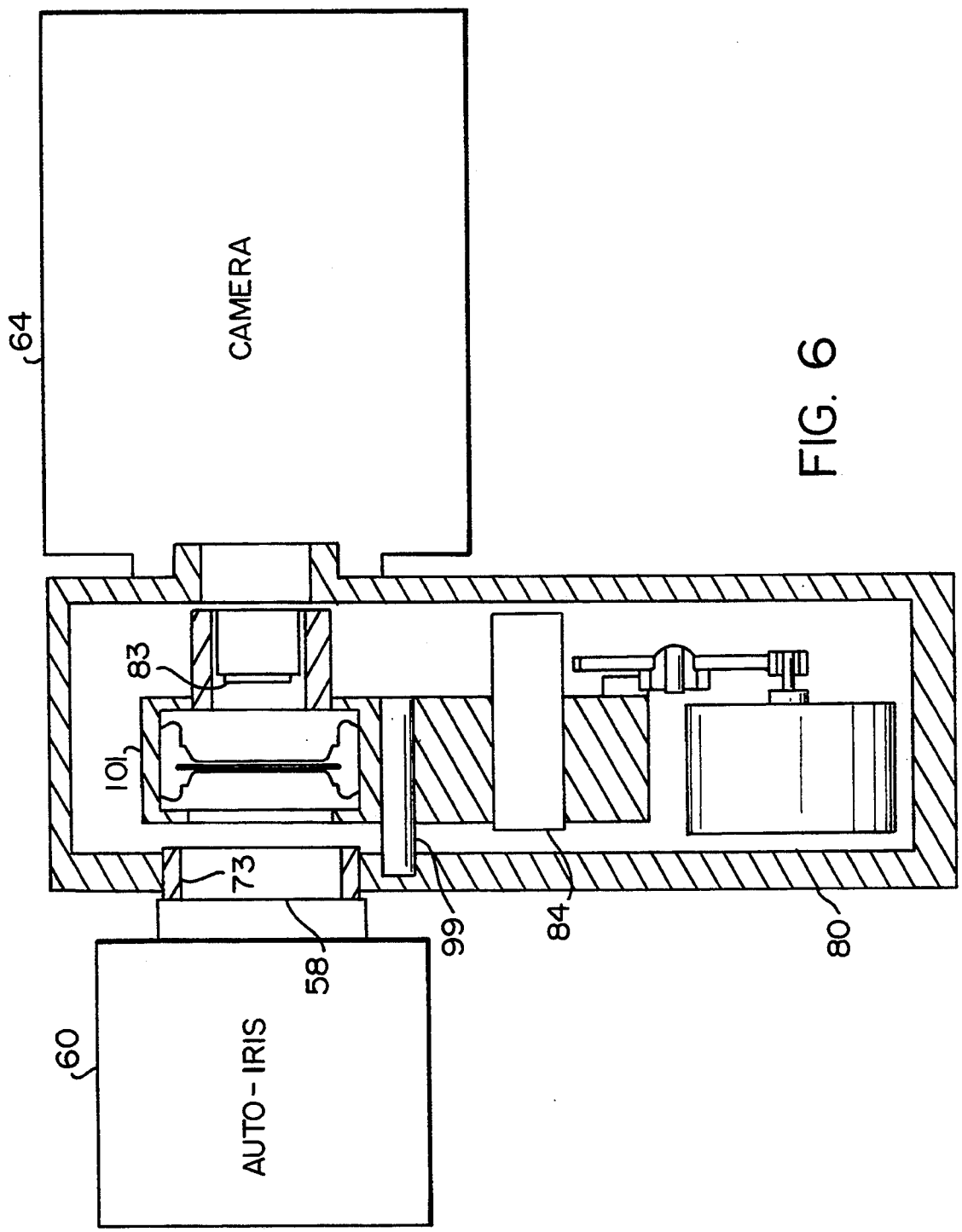

SURVEILLANCE SYSTEM HAVING A MICROCHANNEL IMAGE INTENSIFIER TUBE

BACKGROUND OF THE INVENTION

The present invention relates generally to surveillance systems, such as closed-circuit security or industrial inspection television systems, and more particularly to a novel system capable of permitting either daylight or enhanced night "vision" which operates with natural light without added illumination.

Image intensified television cameras suitable for use in closed circuit television (CCTV) systems are of two basic types. One involves the use of image orthicon television cameras utilizing lenses to focus the image onto the camera. To achieve better low-light sensitivity, such cameras are often supplemented by infrared illuminators. The second type consists of a lens to focus light onto the photocathode of a night-vision image intensifier tube, the image intensifier tube, and a direct coupled CCD device (charge coupled device) television camera or a transfer lens to focus the output of the intensified image onto the CCD input of the video camera. At the heart of such a CCTV system is the light amplifier image intensifier tube (usually referred to as a generation or Gen I, II or III type-device).

Image intensifier tubes (also called image enhancement tubes or simply image tubes) were first developed in the mid to late 1930's for military night vision applications. The early electro-optical low-light amplifiers were image converter infra-red tubes, also known as Gen 0 and Gen 1 night amplifier tubes. These were used successfully for many years. A successor to these tubes was the microchannel intensifier. It was a great improvement in size, cost and performance. A microchannel intensifier tube basically consists of a photo-sensitive cathode, a microchannel plate (MCP), and a phosphor output screen and means to create appropriate fields within the tube. The photocathode converts incoming photons representing an image to a corresponding spatially positioned stream of electrons. The electrons are accelerated to an MCP which intensifies the flow of electrons. At the output of the MCP the intensified electrons are accelerated again by another strong electric field to strike the luminescent phosphor screen whereat an enhanced visible image is created. The MCP consists of a two-dimensional array of miniature microchannel multipliers. A description of microchannel image intensifiers and the fabrication of microchannel plates can be found in "The Microchannel Image Intensifier," *The Scientific American*, Vol. 245 (November 1981) pp. 46-55 by Michael Lampton.

Microchannel image intensifiers are frequently employed today in applications requiring high amplification of extremely low-light levels. One obvious advantage of the current generation of microchannel image intensifiers is their light sensitivity which obviates the need for auxiliary irradiation either in the visible or near-infrared spectrum. They are particularly suited to night-time surveillance in military or police applications since they have high luminous gain, high image resolution and excellent low light sensitivity. In addition Gen III tubes are particularly sensitive in the near-infrared (NIR) spectrum, which makes them particularly useful in night time surveillance since night sky radiation is particularly high in the non-visible NIR region.

Image intensifier tubes and cameras have improved over the years, and today there are probably 50 different low light level camera systems made by a dozen or more manufacturers. Notwithstanding this there are drawbacks that limit use in modern image intenifier tubes even in the case of the latest generation units. Although relatively inexpensive when compared to earlier systems, there are many surveillance and security applications where the marketplace can not accept the $9,000 to $20,000 price tag of individual image intensifier TV cameras. In addition to the initial acquisition cost, the annualized replacement costs of image intensifier tubes or SIT camera tubes (silicon intensifier target) are inordinately high due to their restricted shelf life and even shorter operating lifetime. The operating lifetime of these tubes is dramatically reduced by exposure to high light levels. Also applications requiring continuous (24 hours/day) operation can shorten useful lifetime considerably. Gating of the high-voltage power supply has been used to limit the on time of the tube in certain applications, but there are other tradeoffs with such modifications. Compounding the replacement cost is the difficulty of replacing an image tube. It is often mechanically bonded to the optics assembly and TV camera requiring replacement of the entire system, or at the very least an involved and costly unsealing repair process.

This invention is directed to a novel video camera "attachment" which in its simplest form gives improved night surveillance and in its preferred form converts a normal day-light video camera to a day/night camera without requiring active or additional illuminators, IR or others, and which can be used with a color "daytime" monitor.

The invention may also be incorporated into a camera lens arrangements with automatic or manual iris or diaphram adjustment for day/night operation.

Another general object of this invention is to provide an image intensifier television camera design that minimizes the active operational time required of the image intensifier tube and thereby prolongs the life of the tube.

SUMMARY OF THE INVENTION

In accordance with the teachings of the present invention, these and other objectives are achieved in through a novel low-cost closed circuit TV (CCTV) system capable of operating without active IR illuminators in low-light applications, including telephoto and "pin-hole" applications. A high-gain image intensifier tube suitable for CCTV systems has utility for, low-light applications, and is not needed under normal daytime lighting conditions other than as a light conduit. By mounting, in the preferred embodiment, an image intensifier tube on a rotatable disc along with an optical path length compensator (OPLC) which may be made from a fiber optic arrangement or fiber optic plate, a glass plate or other media to include lenses, or from a lens, designed to have the same optical path length as the image intensifier tube, the image intensifier tube can be physically moved into and out of the optical through path and the replacement OPLC can be substituted therefor. The substitution of fiber optics, glass plates or other image transfer media is greatly simplified through the use of a non-inverting image intensifier tube.

In operation within the system the image intensifier tube is switched off and moved out of the optical path when the input light level exceeds a predetermined level. Similarly, the OPLC is moved out of the optical path when the input light level drops below a predetermined level. At that time the image intensifier tube is activated and moved back into the optical path. With each substitution of the intensifier tube or the OPLC, an auto-iris lens automatically adjusts to accommodate the optical throughput of the new optical tranmission.

Although not incorporating all of the benefits of this invention, a significant and inexpensive improvement over present practices can be achieved by placing an image intensifier tube into a lens array with a driving power supply and an iris arrangement to provide another form of simplified low cost day/night system. Typically in daytime operation the iris will be set to a pin hole opening; whereas at night the iris will be close to or fully open depending on the ambient light and the image intensifier tube in use.

In accordance with another aspect of the present invention, other objectives are achieved through a novel attachment device to a standard day type video camera that converts the camera to a day/night camera. The attachment device interconnects the camera to a standard iris lens which may also be an auto iris lens. The attachment device consists of a housing for an image intensifier tube, an optical path length compensator, a relay lens and associated electronics for control and power functions. The housing has a threaded input and output to physically and optically interconnect the iris lens directly to a video camera. Either the image intensifier tube or optic image conduit are automatically switched into the through optical path to receive and either amplify or simply transmit the image to a relay lens. The relay lens focuses the output image from either the image tube or the OPLC onto the optical input or focal plane of the video camera. The switching of the image intensifier tube or the OPLC to the through optical position is dependent upon ambient light conditions of the camera so that when the lighting for normal daytime viewing is insufficient the image tube is activated and switched into the through optical path of the camera. In connection with this attachment device there is disclosed a novel unitary structure which among other elements includes an image intensifier tube and its power supply. The power supply in the preferred embodiment does not require an automatic brightness control as has been the case in prior commercial and military applications in which power supplies are tied to image intensifier tubes. In this invention, the power supply is designed to produce fixed voltages at the cathode, MCP contacts and as an output voltage, permitting the auto-iris camera combination to control the brightness of the image. This simplifies the power supply considerably since it no longer has to control brightness.

BRIEF DESCRIPTION OF THE DRAWINGS

A better understanding of the invention may be had from a consideration of the following detailed description, taken in conjunction with the accompanying drawings in which:

FIG. 6 shows a side sectional view (section A—A) of an alternative embodiment of the image intensifier tube and lens assembly shown in FIG. 3.

DETAILED DESCRIPTION

Figure 1:
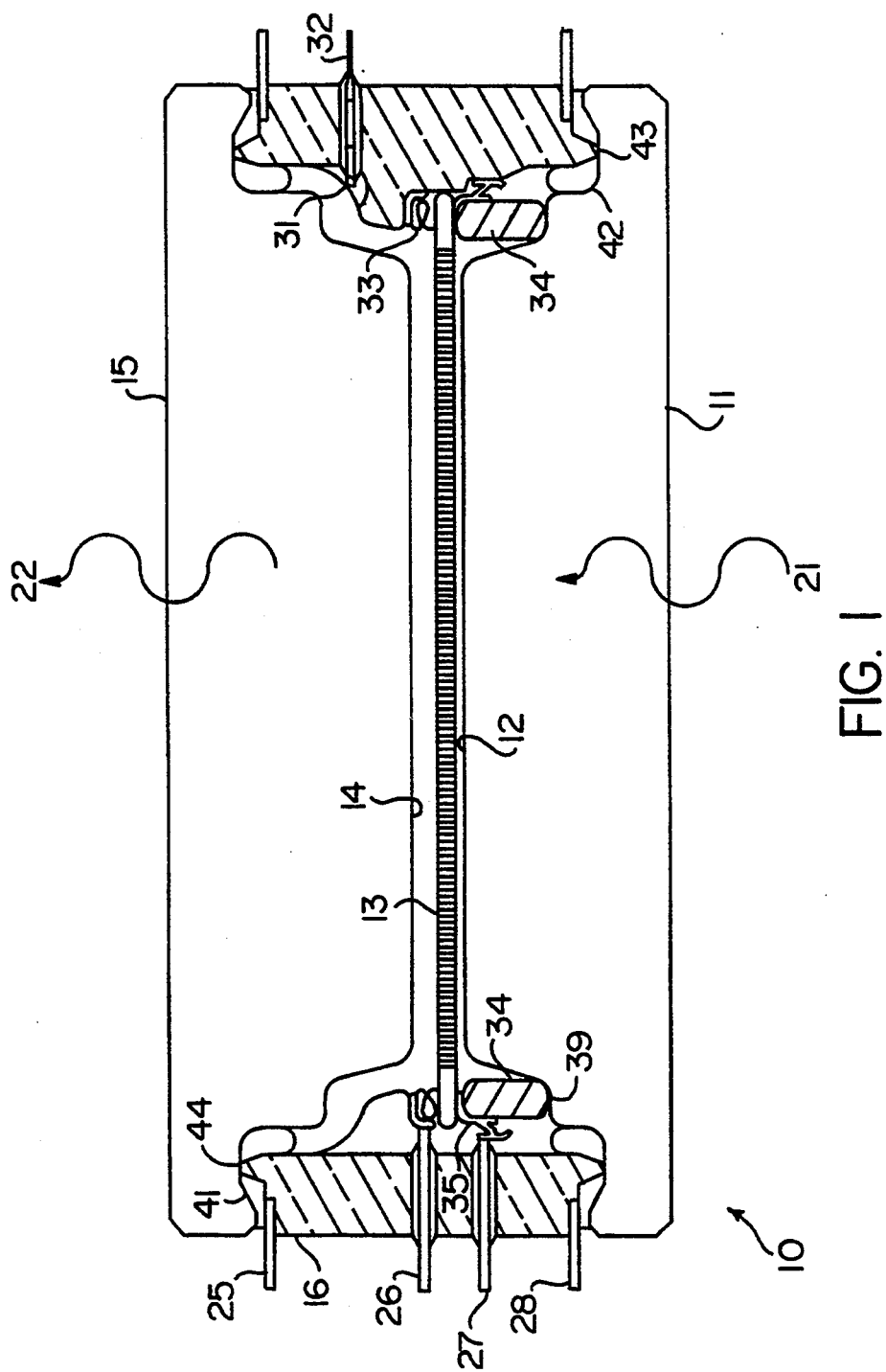
FIG. 1 is an enlarged cross-sectional representation of an image intensifier tube.

Referring now to FIG. 1, the cross section of an image intensifier tube 10 is depicted and includes: an input glass window 11, a photocathode 12 bonded to the surface of the input window, a microchannel plate 13 spaced apart from the photocathode, a phosphor screen 14 bonded to a glass output window 15 on the inner surface adjacent to the microchannel plate 13. Glass windows 11 and 15 also act as faceplates to the tubular housing 16 sealing the interior components 12, 13 and 14 in a vacuum. Housing 16 is preferably a solid ceramic body although glass or other insulator materials could be used. Photocathode 12 may optionally be deposited onto the surface of input window 11. Greater detail regarding this intensifier tube may be found in a copending, commonly owned, simultaneously filed, application in the names of Johnson, Scott and Bartz assigned Serial No. 08/063,234, entitled "A Microchannel Image Intensifier Tube."

All of the numerical dimensions and values that follow should be taken as nominal values rather than absolutes or as a limitation on the scope of the invention. These nominal values are examples only. Many variations in size, shape and types of materials may be used as will readily be appreciated by one skilled in the art as successfully as the values, dimensions and types of materials specifically set forth hereinafter. In this regard where ranges are provided these should only be understood as guides to the practice of this invention.

Figure 2:
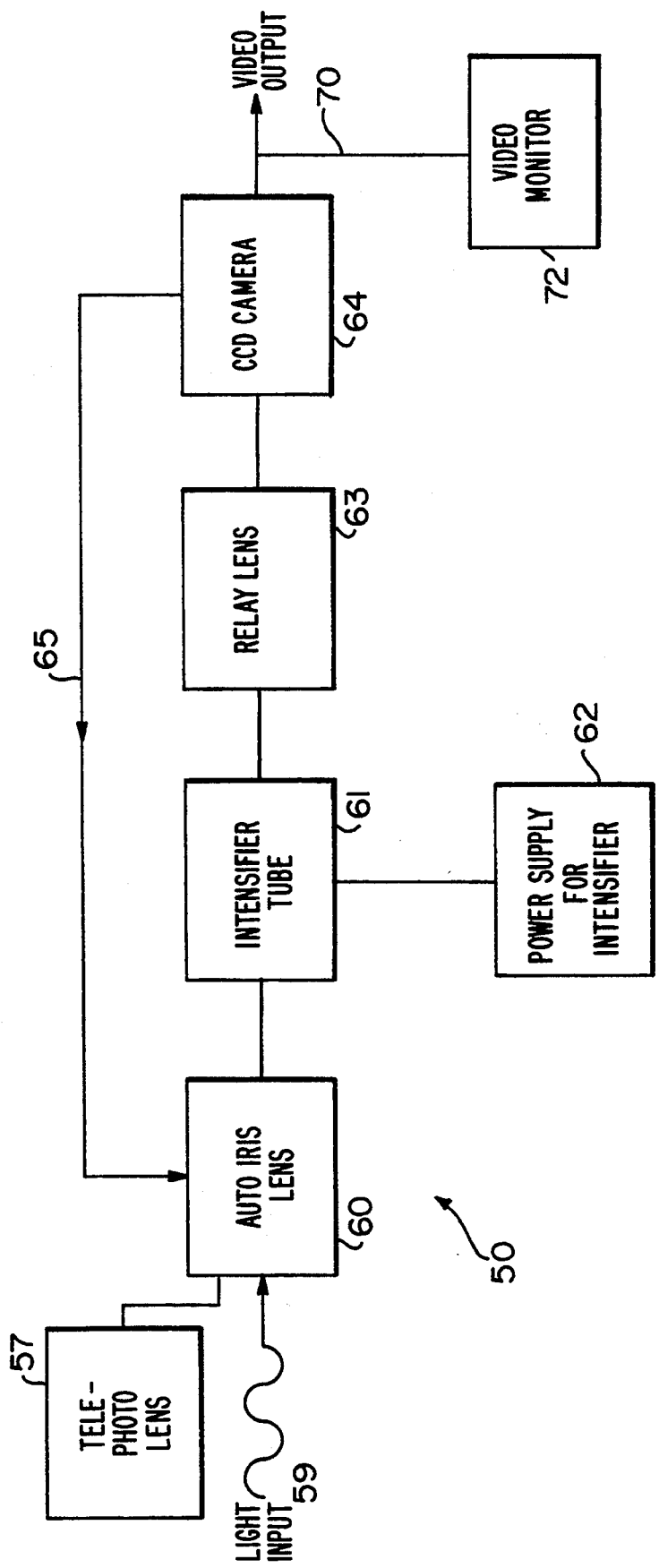
FIG. 2 is a block diagram representation of an intensified video camera system suitable for use in a low-cost CCTV system.

FIG. 2 shows a block diagram of a video camera system 50 suitable for use in a low-cost CCTV systems capable of operating under all environmental lighting conditions without additional external illumination. Operationally, light 59 enters the through the camera system 50 through an automatic-iris camera objective lens assembly 60. This assembly 60 controls the amount of light allowed to pass to image intensifier tube 61, which may, for example, comprise the tube shown in FIG. 1. Power supply 62 is a high-voltage power supply for supplying the proper voltages to tube 61. In the preferred embodiment the voltage requirements are for fixed voltages applied to various points in the tube as previously described. The output light is optically focussed by relay lens 63 on to the input of a CCD camera 64. A feedback signal proportional to the intensity of the light into camera 64, is applied through lead 65 to control the auto-iris lens assembly 60. The video image outputted on lead 70 may be viewed on a CCTV monitor 72.

A principal advantage of the system depicted in FIG. 2 is the modular approach in use. By using components that can be easily coupled together, such as by means of screw-on interface couplings, fabrication costs and repair and replacement costs can be dramatically reduced. The design choice of a glass output window on intensifier tube 61 and a relay lens 63 to focus the output on to the input of camera 64, permits all of the components to be readily coupled together or uncoupled for replacement of the tube, camera or other components. Prior art systems couple the image intensifier tube output directly to the CCD of camera 64 via a fiber optic image conduit that is bonded and sealed in a vacuum to the CCD camera input. Not only is this prior art (CCD wafer-to-fiber optic bundle) interface expensive to make, it is impossible for a customer/user to replace the camera 64 or the intensifier tube 61 if something goes wrong with either component without replacing the entire system. The system depicted in FIG. 2 does not have this disadvantage. Notwithstanding this advantage, it is recognized that, even though the glass output window has only about one-half the throughput compared to its fiber optic equivalent and that the fiber optic equivalent has better optical resolution capability since much of the light exiting the phosphor screen of intensifier tube 61 is lost and cannot be focused onto the CCD camera input, one achieves approximately the same or better optical performance as a totally sealed system by using an intensifier tube that has high gain and a high signal-to-noise ratio (such as the one depicted in FIG. 1). In any case the video camera system 50 of this invention is a lower cost alternative to the prior art systems for the reasons mentioned and even with the losses, if a Gen III tube is used in the system, operation even on dark nights is more than fully satisfactory.

Figure 3:
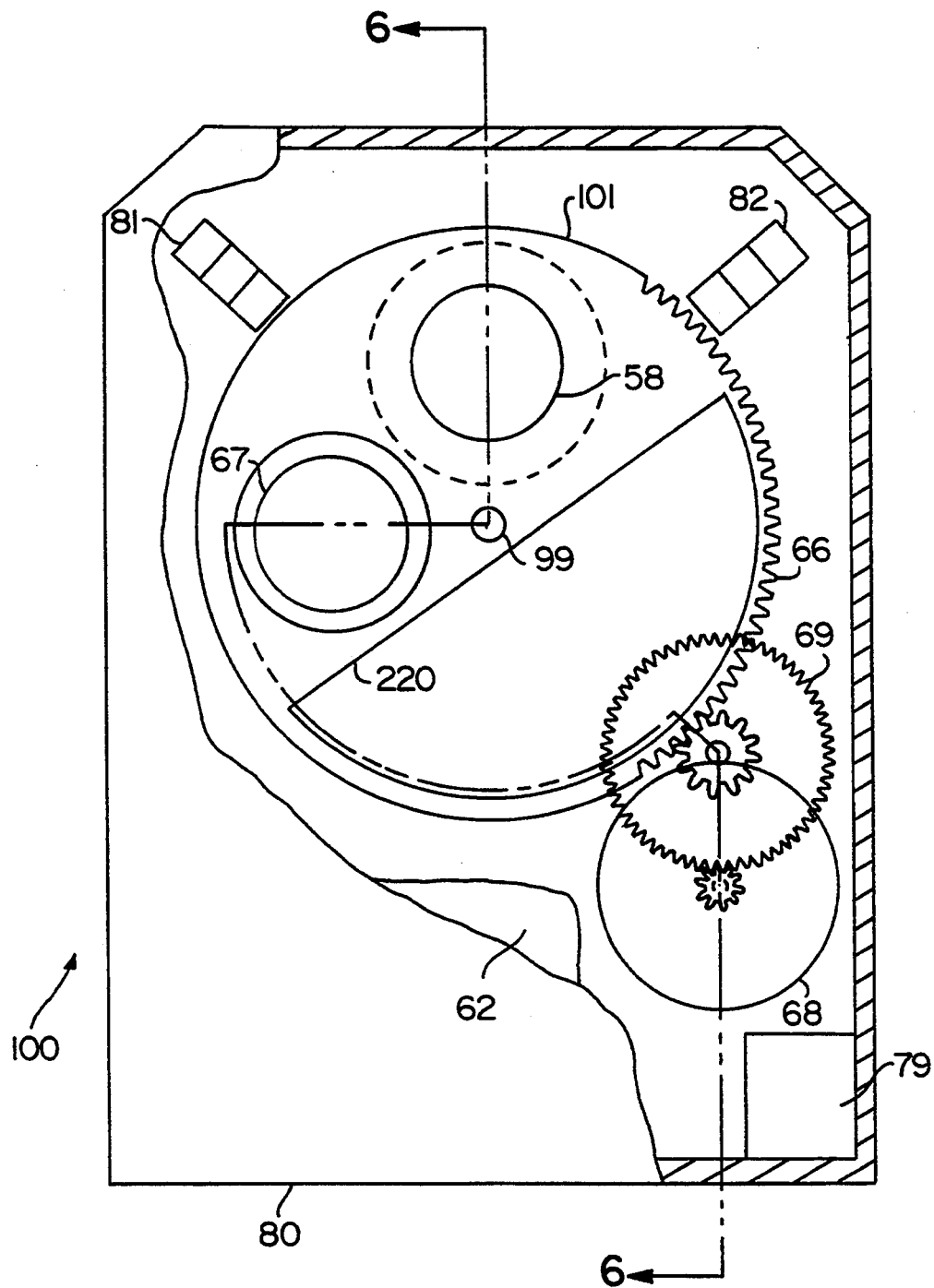
FIG. 3 shows a partially cut away front view of an image intensifier tube and lens assembly.
Figure 4:
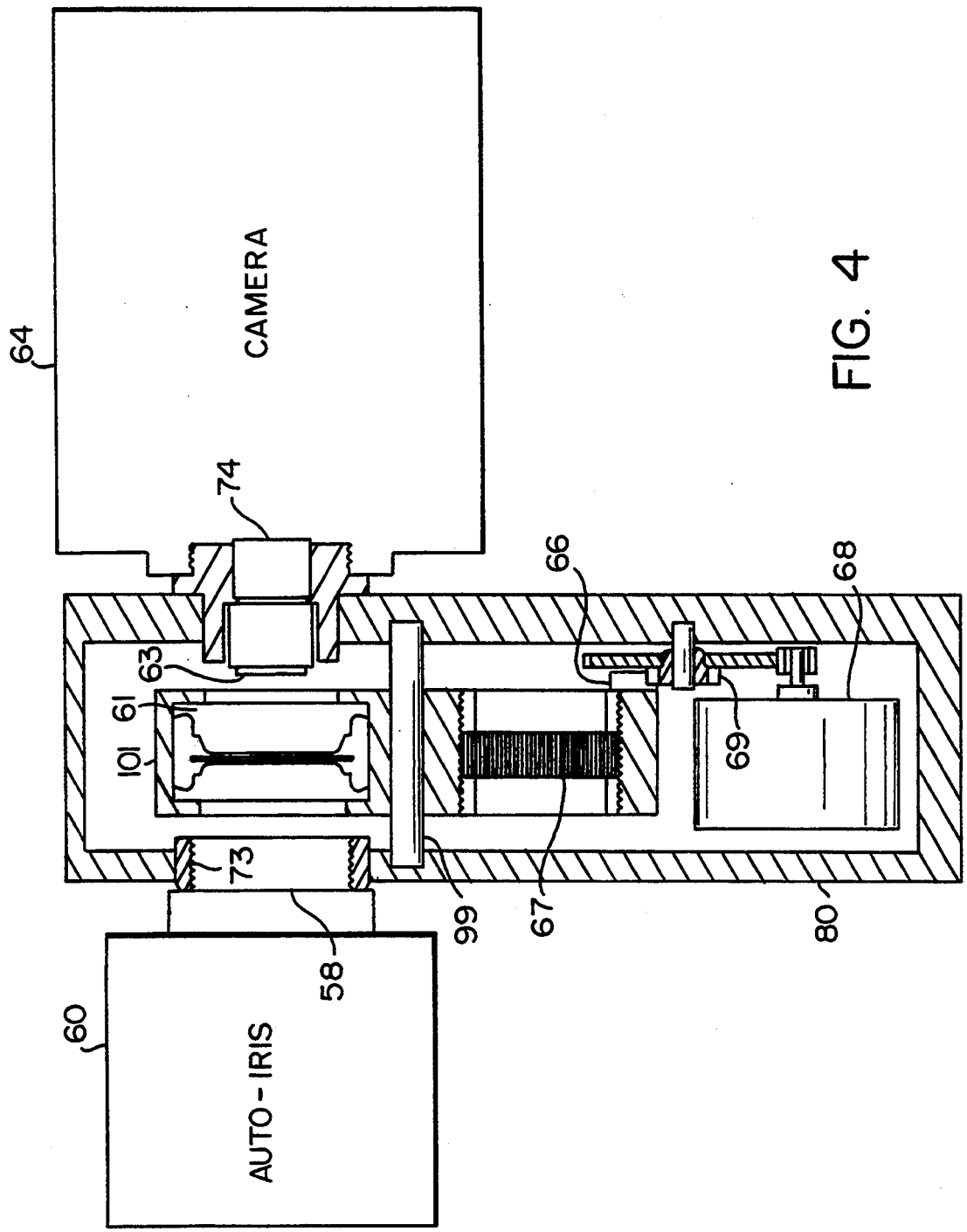
FIG. 4 shows a side sectional view (section A—A) of the image intensifier tube and lens assembly shown in FIG. 3 coupled to an objective lens assembly and a standard video camera.

Another principal aspect of this invention may be understood by reference to FIG. 3, which depicts a partially cut-away front view of a structural housing for an image intensifier tube and relay lens assembly. FIG. 3 should be read in conjunction with FIG. 4 which depicts a side sectional view, taken along line A—A in FIG. 3. As will be seen, the structure depicted in FIGS. 3 and 4, comprises a CCTV camera "attachment" that converts a normal day-light video camera to a day/-night camera. As depicted in FIG. 4, the auto-iris lens 60 and the CCD camera 64 connect to the intensifier tube 61 and relay lens 63, respectively, via a connecting means such as a standard "C-mount" screw thread arrangement available on all commercial video products. Therefore, to convert a normal video camera to one having 24-hour viewing capability, what is required is to remove the standard auto-iris lens from the camera, connect the "attachment" to the camera and then replace the auto-iris lens at the input 58 shown in FIG. 4. The power connection from this attachment is to a power source which may comprise battery power as is used to power the camera. Alternatively, 24 Vac or 12 Vdc, commonly available power sources for CCTV installations, can be used as the power source for the attachment.

Figure 5:
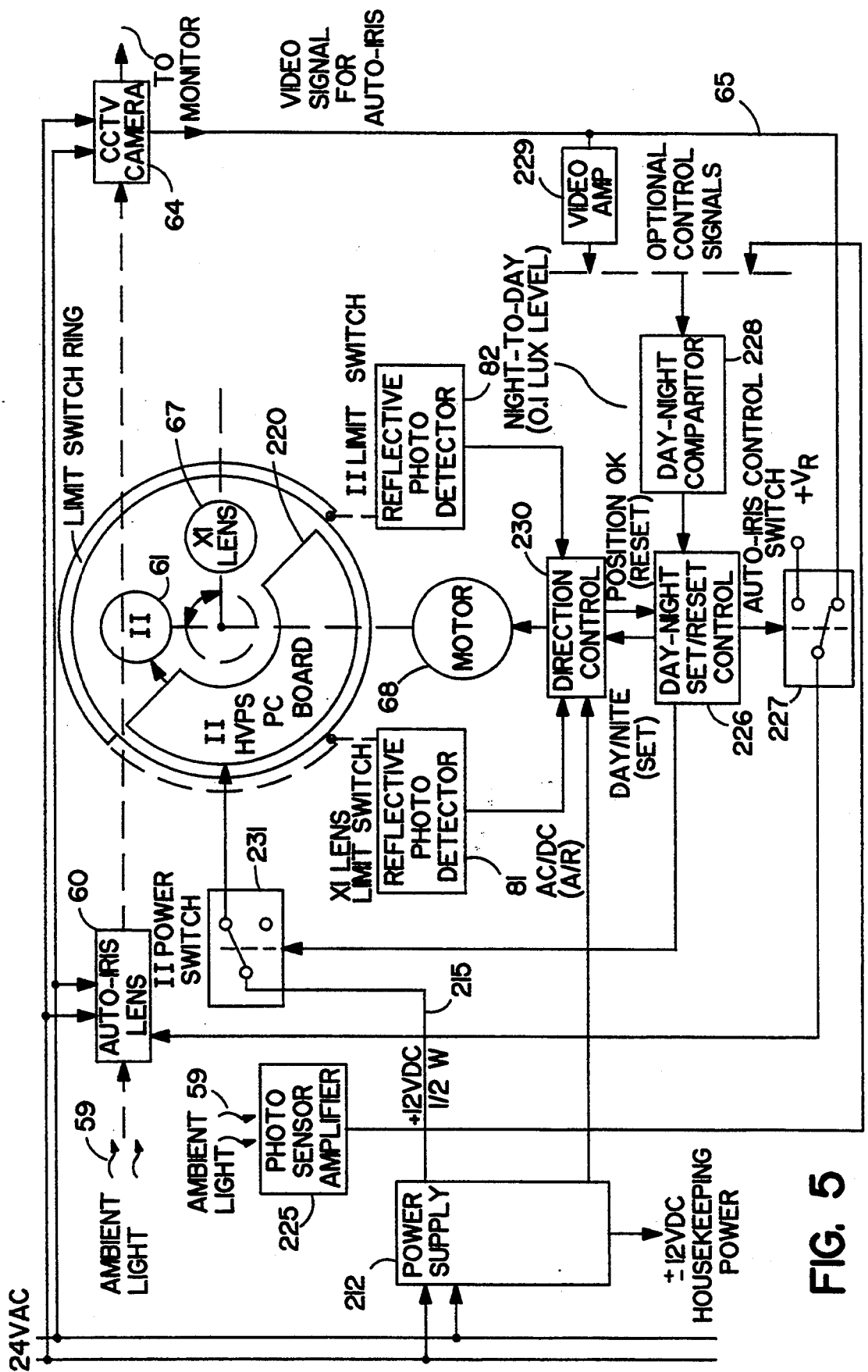
FIG. 5 is a block diagram representation of a control system for the image intensifier camera shown in FIGS. 3 and 4.

Referring again to FIG. 3 and FIG. 4, housing 80 provides the structural support for the following components: image intensifier tube 61, an OPLC 67, each of which is mounted on a rotatable disc 101 within housing 80 along with a high-voltage power supply 62. The high-voltage power supply 62 may be mounted on disc 101, as shown by the semi-circle outline 220 (FIG. 5). This design feature avoids moving, during rotation of disc 101, the several high voltage leads that power image intensifier tube 61. Position sensors 81 and 82 provide electrical output signals to indicate the position of disc 101 at all times. In the configuration shown in FIGS. 3 and 4, auto-iris lens 60 screws onto opening 58 which is optically aligned with the input window of the image intensifier tube 61. As stated earlier, screw threads 73 may be part of a standard C-mount to accept the male threaded auto-iris lens. Similarly, CCD camera 64 screws onto the threaded opening to be aligned with, in this embodiment, relay lens 63. (Both the auto-iris lens 60 and the CCD camera 64 may for example be "C-mounted," to housing 80 for ease of replacement.) Electronics shown as block 79 are contained in housing 80 to control the automatic switching and rotation from night-time/low-light operation to daytime/high-light operation. In some embodiments it is desireable to manually control the switching from daytime to night-time operation and in such case the automatic system 79 is either disabled or dispensed with in the system.

One of the principal advantages of this design is the rotatable disc feature that allows the image intensifier tube 61 to be inactivated and physically replaced in the through optical path by an OPLC 67 having the same optical path length as the image intensifier tube. Disc 101 rotates to permit either image intensifier tube 61 (the normal night-time configuration) or OPLC 67 (the normal daytime configuration) to be in the optical path. Turning the image intensifier tube 61 off during day light operation not only increases the operating lifetime by reducing the on time to about 50%, but it also makes it possible to use a much less expensive auto-iris lens 60, since the auto-iris lens only needs to have an operational range of $10^4$ lux as opposed to $10^8$ lux that would otherwise be required. Switching from a night-time configuration to a daytime configuration may be performed automatically and initiated by either a photo sensor 225 (FIG. 5) or by feedback control signal via lead 65 from video camera 64. Motor 68 (FIG. 4) in combination with a gear drive assembly 69 provides the drive mechanism to move gear teeth 66 and thus disc 101 about a rotatable pivot shaft 99. As shown in FIG. 3, a simple 90° rotation of disc 101 moves either the image intensifier tube 61 or OPLC 67 into the optical path.

Although there are image intensifier systems having means to deactivate the image intensifier tube during day-light operation, such as those found in rifle sites, none is known to have a common optical path for both day-light and night-time operation with means to deactivate the intensifier tube. Most systems use two separate optical channels operating as two independent systems. A reason for this may be the design problems inherent in physically removing the image intensifier tube from the optical path. A problem that must be addressed is how to replace the optical gap left, albeit small, when the image tube is physically removed from the optical path. (The image intensifier tube creates an optical image gap between the photocathode 12 in FIG. 1 and the phosphor screen 14, and the glass faceplates 11 and 15 have an index of refraction >1 that also must be taken into consideration if removed from the optical path.) The focal plane of the auto-iris objective lens 60 is at the surface of the photocathode 12 in FIG. 1; whereas, the focal plane of the relay lens 63 is at the surface of the phosphor screen 14. In the preferred embodiment of image tube 61, this separation is ≈0.055" (≈1.4 mm). A solution that provides poor results is to move inward either the auto-iris objective lens 60 or the relay lens 63 when the image tube is removed. Moving the relay lens results in a change in the magnification of the image; whereas, moving the objective lens adds undue mechanical complications. Thus in the preferred embodiment, the OPLC 67 has a ≈0.225" effective pathlength. If a glass plate is used, a 0.551 thick plate will properly match the image tube's effective optical path length.

The electrical control system depicted in FIG. 5 is illustrative of many different ways for controlling the rotation of disc 101 to replace the image intensifier tube 61 with an optical path compensator 67 and vice versa. Specific examples as used in this preferred embodiment are set forth. However, as will be apparent to one skilled in the art these may vary considerably in achieving the objectives of this invention. Referring to FIG. 5, input power (±24 Vac) is applied to a standard regulated power supply 212 that provides a regulated ±12 Vdc to the active components in the image intensifier assembly 100 (FIG. 3). A +12 V output is conducted on lead 215 to the high voltage power supply 220 via relay switch 231. Relay switch 231 interrupts the input power to the high voltage power supply 220 when the image tube 61 is removed from the optical path, and enables the same high voltage power supply when the image tube 61 is inserted back into the optical path. There are two ways shown in FIG. 5 for determining when to interchange image tube 61 for fiber optic image conduit 67. As will be explained either the feedback control signal on lead 65 or alternatively an independent photosensor and amplifier 225, if activated, initiate the switching of image tube 61 with OPLC 67. Incoming (ambient) light enters the auto-iris lens 60 and is either amplified or passed through to the relay lens 63 (FIG. 4), depending upon whether image tube 61 or OPLC 67 is in the optical through path. The light image is then picked up by video camera 64. Operationally when the light at the input to video camera 64 drops below 0.1 lux, image tube 61 is activated and inserted into the optical path. The feedback control signal on lead 65 is applied, via video signal amplifier 229, to a day/night comparator circuit 228. When the level of the video control signal on lead 65 drops below a predetermined level indicating that the iris is fully open and the ambient light is below the 0.1 lux needed for acceptable video monitoring, comparator 228 signals the set/reset control circuit 226 to switch to image tube 61. At that point, the set/reset control circuit 226 takes control of the auto-iris 60 by closing down the iris via control switch 227. Control circuit 226 also initiates the substitution of image tube 61 for OPLC 67 by sending a "set" signal to direction control circuit 230. Direction control circuit 230 energizes motor 68 causing disc 101 to rotate to place image tube 61 in the optical through path. Limit switch 82 senses when disc 101 is in the proper position for the image tube to operate causing direction control circuit 230 to deactivate motor 68. Once image tube 61 is operational (after a timed interval), control circuit 226 releases control of the auto-iris control switch 227 permitting the auto-iris 60 to again be proportionally controlled by the video control signal on lead 65. The actual change over from fiber optic plate 67 to image tube 61, or vice versa, takes about 1 second in the preferred embodiment. During this change over period, the circuit seizes control of the auto-iris lens 60 to close down the iris lens and protect image tube 61 from potential burn out. In the transition from night to day when the iris lens closes down fully to restrict the incoming light, the level of the video control signal on lead 65 increases above a predetermined level indicating that the iris lens is closed and the ambient light is above the 0.1 lux needed for acceptable video monitoring. Then the process basically repeats itself substituting the OPLC 67 for image tube 61.

In the previously discussed image enhancement system depicted in FIGS. 3 and 4, the image intensifier tube 61 may be physically replaced in the through optical path by a fiber optic image conduit or other optical path length compensator 67 through a rotation of disc 101. Alternately, the image intensifier tube 61 may be physically replaced during periods of daytime lighting by a second relay lens. FIG. 6 depicts a partially cutaway front view of an alternate structural housing for an image intensifier tube and a second relay lens 84 as part of rotatable disc 101. In this embodiment relay lens 83 that operates in conjunction with the image intensifier tube 61 is supported, not by the housing 80, but by an added flange on disc 101. Although the focal planes remain the same as the other structural embodiment, lens 83 rotates out of the through optical path with the image intensifier tube 61. A second relay lens 84 moves into the through optical path position vacated by the image intensifier tube 61 and the first relay lens 83. By being able to replace the combined tube and lens structure 61 and 83, a second lens can be designed to have basically the same functional performance as the OPLC 67 depicted in FIG. 4. The main design criteria is to have the focal plane of the auto-iris objective lens 60 match the focal plane of the second relay lens 84.

Some of the benefits of the previously discussed image enhancement systems can be achieved with portions of the system illustrated in FIG. 2. A lens 57 shown in FIG. 2 which may for example be a telephoto lens, is attached to the front end of auto-iris lens 60 in line with an intensifier tube (and without the other elements of FIG. 2) provides a simple and inexpensive day night system. This is particularly the case when standard C-mount couplings are used. In such an embodiment, one relies on the iris to reduce the daytime input and the intensifier to increase the night time viewing. In this case the image intensifier does not get turned off and thus this embodiment does not obtain the many advantages of the preferred embodiments of this invention. However, it offers a very simple and inexpensive solution to day/night surveillance.

While there has been shown and described particular arrangements of an image intensifier day/night system for the purpose of enabling a person of ordinary skill in the art to make and use the invention, it will be appreciated that the invention is not limited to the specific embodiments described. Instead it is intended to encompass the invention broadly within the scope of the attached claims.

What is claimed is:

1. An image intensifier surveillance camera system having a single optical path for operation in daytime and night-time lighting conditions without additional illumination, said image intensifier surveillance camera system comprising:

an iris lens for receiving incoming light representing a light image, means to regulate the iris lens opening based on the intensity of the incoming light;

a surveillance camera in a fixed position relative to said iris lens and coupled to said iris lens; and an image intensifier assembly comprising an image intensifier tube and an optical path length compensator to present an image corresponding to the input image without inversion and means to position said image intensifier tube or said optical path length compensator in the optical path between said iris lens and said surveillance camera at the camera focal plane.

2. An image intensifier surveillance camera system in accordance with claim 1 in which said optical path length compensator comprises a fiber optic plate.

3. An image intensifier surveillance camera system in accordance with claim 1 in which said optical path length compensator comprises a non-inverting lens.

4. An image intensifier surveillance camera system in accordance with claim 3 wherein said image intensifier assembly includes an image intensifier tube having a feedback limiting microchannal plate including a metalization layer at the output surface thereof.

5. An image intensifier surveillance camera system in accordance with claim 1 wherein said image intensifier assembly comprises: a rotatable disc having mounted thereon said image intensifier tube and said optical path length compensator for rotation of one of said image intensifier tube or said optical path length compensator into the optical path of an incoming image.

6. An image intensifier surveillance camera system in accordance with claim 5 wherein said rotatable disc rotates in response to camera control means controlled by the incoming light intensity.

7. An image intensifier surveillance camera system in accordance with claim 2 in which said surveillance camera comprises a CCD video camera.

8. An image intensifier surveillance camera system in accordance with claim 5 further comprising: a housing for said rotatable disc, said housing having a threaded input and threaded output for coupling the output of said iris lens to said image intensifier assembly and for coupling said image intensifier assembly to said surveillance camera.

9. An image intensifier surveillance camera system in accordance with claim 8 including means to position said optical path length compensator in the optical path length from said iris lens to said camera during daytime lighting conditions of said camera system.

10. An image intensifier surveillance camera system in accordance with claim 8 including means to position said image intensifier tube in the optical path length from said iris lens to said surveillance camera during night-time lighting conditions of said image intensifier surveillance camera system.

11. An attachment for converting a day surveillance camera with an auto-iris assembly to a day/night camera to operate under night-time ambient lighting conditions without additional illumination, said attachment comprising:

a housing having a threaded input and threaded output for optically interconnecting said auto-iris assembly to a camera:

an image intensifier tube;

an optical path length compensator having the same optical path length as said image intensifier tube for presenting an image without inversion at the output end of said optical path length compensator; and means for switching in response to ambient light conditions either said image intensifier tube or said optical path length compensator into optical alignment with said auto-iris assembly and said camera, said image intensifier tube intended for operation under night-time conditions to intensify light images transmitted to said camera and said optical path length compensator intended for operation under daytime conditions to transmit daylight images to said camera.

12. An attachment in accordance with claim 11 further comprising a disc rotatably connected to said housing and containing said image intensifier tube and said optical path length compensator, said disc for automatically rotating in response to said ambient lighting conditions either said image intersifier tube or said compensator into optical alignment with said auto-iris assembly and said camera.

13. An attachment in accordance with claim 12 wherein said optical path length compensator comprises a fiber optics plate.

14. An attachment in accordance with claim 11 wherein said threaded input and threaded output further comprise C-mount connections.

15. An attachment in accordance with claim 14 wherein said image intensifier tube is electrically inactivated so long as said optical path length compensator is positioned to receive light images from said auto-iris assembly in the optical path to said camera.

16. A method of performing surveillance at night and during the day with the same security camera system comprising automatically cycling an image intensifier tube to intensify night-time images into an image optical path feeding to said same security camera system and automatically cycling said image intensifier tube out of said image optical path and an optical path length compensator which does not invert into said image optical path during daytime operation.

17. An attachment in accordance with claim 11 further including a power supply within said housing.

* * * * *